United States Patent [19]
Gao

[11] Patent Number: 5,696,826
[45] Date of Patent: Dec. 9, 1997

[54] METHOD AND APPARATUS FOR ENCRYPTING AND DECRYPTING INFORMATION USING A DIGITAL CHAOS SIGNAL

[76] Inventor: Zhenyu Gao, #205, 1-4 Kaneyama-cho, Kawaguchi-shi, Saitama, Japan

[21] Appl. No.: 488,088

[22] Filed: Jun. 7, 1995

[30] Foreign Application Priority Data

Jun. 7, 1994 [JP] Japan .................................. 6-148645

[51] Int. Cl.$^6$ ...................................................... H04L 9/14
[52] U.S. Cl. ................... 380/28; 380/45; 380/46
[58] Field of Search ................... 380/46, 28, 45

[56] References Cited

U.S. PATENT DOCUMENTS

| | | | |
|---|---|---|---|
| 5,048,086 | 9/1991 | Bianco et al. | 380/46 X |
| 5,365,588 | 11/1994 | Bianco et al. | 380/42 |
| 5,365,589 | 11/1994 | Gutowitz | 380/43 |

OTHER PUBLICATIONS

B. Schneier, "*Applied Cryptography*" 1994, John Wiley & Sons pp. 241, Fig. 10.5.

*Primary Examiner*—Gilberto Barron, Jr.
*Attorney, Agent, or Firm*—Oblon, Spivak, McClelland, Maier & Neustadt, P.C.

[57] ABSTRACT

In an encryption and decryption system, information in plaintext is encrypted by adding to each group of signals in the information a digital chaos signal in accordance with a chaos function, a delay, an initial value, and parameters of the chaos function determined using a cryptographic key which can be any length and any combination of letters, numerals, or words. The encrypted information is decrypted by decrypting each group of signals in the encrypted information using a digital chaos signal which is generated using the same key as that used in the encryption. Accordingly, it is possible to provide enhanced secrecy and to perform encryption and decryption of information at high speed.

8 Claims, 6 Drawing Sheets

The Encryption Process:

The Decryption Process:

Fig.6

```
00000000  61 61 61 61 61 61 61 61-61 61 61 61 61 61 61 61   aaaaaaaaaaaaaaaa
00000010  42 42 42 42 42 42 42 42-42 42 42 42 42 42 42 42   BBBBBBBBBBBBBBBB
00000020  62 62 62 62 62 62 62 62-62 62 62 62 62 62 62 62   bbbbbbbbbbbbbbbb
00000030  63 63 63 63 63 63 63 63-63 63 63 63 63 63 63 63   cccccccccccccccc
00000040  64 64 64 64 64 64 64 64-64 64 64 64 64 64 64 64   dddddddddddddddd
00000050  31 31 31 31 31 31 31 31-31 31 31 31 31 31 31 31   1111111111111111
00000060  32 32 32 32 32 32 32 32-32 32 32 32 32 32 32 32   2222222222222222
00000070  0D 0A 57 68 65 6E 20 6D-6F 64 65 6C 69 6E 67 20   ..When modeling 
00000080  73 79 73 74 65 6D 73 20-69 6E 20 74 68 65 20 72   systems in the r
00000090  65 61 6C 20 77 6F 72 6C-64 2C 20 77 65 6C 6C 20   eal world, well 
000000A0  64 65 66 69 6E 65 64 20-70 72 6F 62 6C 65 6D 73   defined problems
000000B0  20 77 68 65 72 65 20 74-68 65 20 63 61 75 73 61    where the causa
000000C0  6C 20 72 65 6C 61 74 69-6F 6E 20 62 65 74 77 65   l relation betwe
000000D0  65 6E 20 66 61 63 74 6F-72 73 20 63 61 6E 20 62   en factors can b
000000E0  65 20 65 78 70 72 65 73-73 65 64 20 62 79 20 75   e expressed by u
000000F0  73 69 6E 67 20 66 75 6E-63 74 69 6F 6E 20 72 65   sing function re
```

Fig.7

```
00000000  19 FB 06 4C E5 F8 32 BB-08 63 16 1A 15 A5 51 C4   ...L楼2ｻ.c...･Qﾄ
00000010  15 96 50 59 45 7D A5 22-7D E6 D7 EE 9C E2 7A 40   .鳳YE)･")赚..窖@
00000020  AD A3 E0 4B 78 0A 1A BD-3D 4F 39 0C 4F 5C 14 C5   ｭ|潭x..ｽ=O9.O¥.ｷ
00000030  0A 47 3A 70 D7 FC C5 2D-7C 2D 6D DB 15 8C 39 BE   .G:pﾗ..-|-mﾛ..9ｾ
00000040  F5 62 7A 8D EE B5 86 32-0C 3E 58 D6 11 1F A9 8B   .zｸ作才.2.>Xﾖ..ｩ玉
00000050  CA 7C 9E 37 5A 54 33 29-08 8C B2 C8 5F 77 65 03   |.7ZT3).鹸ﾈ_we.
00000060  91 11 1B E6 43 2D 8B B9-10 4D 28 94 5D 54 C7 25   ...褄-胸.M(脳T%
00000070  2A 7C 39 31 35 DF 86 DD-A2 DE 8F 98 6F AD B5 2F   *|915ﾟ･「"序oｭ才/
00000080  DE A5 25 73 D3 CE B6 36-6B 12 A9 8F 9C 1A 3C 5C   "･%sﾓﾎﾊ6k.ｩ除
00000090  01 45 07 F9 CF 07 A0 11-91 32 31 D2 3E 62 13 3B   .E.......21ﾒ>b.;
000000A0  86 B3 8B 08 B9 42 7C 8C-E6 D0 B8 61 63 0B B9 5F   ･･ﾊB|梧ﾐac.ｹ_
000000B0  35 45 7A BE 06 DE AA 0D-B2 6E 7B C6 52 23 F1 7B   5Ezｾ."ﾞ.ｨn{ﾆR#..
000000C0  4E E6 FB 3A 73 4D 37 C4-A6 21 DC 9D C8 35 77 40   N鶸:sM7ﾄｦ!ﾜ敲5w@
000000D0  FE 2A 99 83 9E 98 8D 31-24 CF AC CE B1 51 2A 9D   .*刄棋.1$ﾏｬﾎｱQ*.
000000E0  17 D9 78 5B F7 68 0B 9B-C1 E4 E6 78 9C EC 16 C4   .ﾘx[...崔蓙x懊ﾄ
000000F0  57 45 77 94 63 84 F3 62-65 C2 5A 62 A3 EB 8E 6E   WEw把..beﾂZb｣..n
```

Fig.8

```
00000000  61 61 61 61 61 61 61 61-61 61 61 61 61 61 61 61   aaaaaaaaaaaaaaaa
00000010  42 42 42 42 42 42 42 42-42 42 42 42 42 42 42 42   BBBBBBBBBBBBBBBB
00000020  62 62 62 62 62 62 62 62-62 62 62 62 62 62 62 62   bbbbbbbbbbbbbbbb
00000030  63 63 63 63 63 63 63 63-63 63 63 63 63 63 63 63   cccccccccccccccc
00000040  64 64 64 64 64 64 64 64-64 64 64 64 64 64 64 64   dddddddddddddddd
00000050  31 31 31 31 31 31 31 31-31 31 31 31 31 31 31 31   1111111111111111
00000060  32 32 32 32 32 32 32 32-32 32 32 32 32 32 32 32   2222222222222222
00000070  0D 0A 57 68 65 6E 20 6D-6F 64 65 6C 69 6E 67 20   ..When modeling 
00000080  73 79 73 74 65 6D 73 20-69 6E 20 74 68 65 20 72   systems in the r
00000090  65 61 6C 20 77 6F 72 6C-64 2C 20 77 65 6C 6C 20   eal world, well 
000000A0  64 65 66 69 6E 65 64 20-70 72 6F 62 6C 65 6D 73   defined problems
000000B0  20 77 68 65 72 65 20 74-68 65 20 63 61 75 73 61    where the causa
000000C0  6C 20 72 65 6C 61 74 69-6F 6E 20 62 65 74 77 65   l relation betwe
000000D0  65 6E 20 66 61 63 74 6F-72 73 20 63 61 6E 20 62   en factors can b
000000E0  65 20 65 78 70 72 65 73-73 65 64 20 62 79 20 75   e expressed by u
000000F0  73 69 6E 67 20 66 75 6E-63 74 69 6F 6E 20 72 65   sing function re
```

Fig.9

```
00000000  AD DC B2 D1 51 37 6D C0-13 4F A2 73 46 F4 D3 57   ｴﾜｲﾑQ7mﾀ.O｢sF..W
00000010  01 E4 24 FA 11 F6 E9 87-13 6C 1A F6 ED 10 31 90   ..$......l....1.
00000020  08 31 EA A1 0C 46 8E C1-46 63 E3 FA 10 65 7B 53   .1...F舒Fc唇.e{S
00000030  73 04 10 E0 12 99 E0 ED-CA C5 62 35 82 CD 5A 97   s....吭..ﾄb5はZ齢
00000040  EE B4 90 93 02 8B 67 7B-BC 56 8C B3 E2 CC 4E 0F   ｴ嵩.吉{ｼV 元篶N.
00000050  4D 09 E1 A0 68 D8 94 78-4C 20 29 FD EF F3 99 8A   M.ｧhｿ肺L )...剃
00000060  72 A2 A5 89 36 A4 18 98-12 E0 97 C1 C4 C7 DA C4   r｢..6､...燉ﾁﾄﾇﾘﾄ
00000070  3E 75 68 49 5A 66 B0 B9-16 D1 6C 18 2E 36 ED AF   >uhIZfｰｹ.ﾑl..6..
00000080  DD B3 56 26 AD 58 03 C7-16 4C 23 96 14 09 4C 23   ﾝｳV&ｭX.ﾇ.L#...L#
00000090  D8 84 32 BF 36 BF D2 74-5D CE 4A 33 D9 22 44 8A   ﾘ.2ｿ6ｿﾒt]ﾎJ3ﾙ"D嚇
000000A0  64 0A CB 9A 6B DD 92 D6-21 7A 4D 43 28 CB D6 A7   .ﾋ嗅ｿ椿!zMC(ﾋ3ｧ
000000B0  4B AF FC 16 C3 FF 80 FB-FB 49 F2 32 5F A9 2E 87   Kｯ.ﾃ....I.2_ｩ..
000000C0  05 25 38 85 B4 27 C7 3C-7F DF 46 FE 48 D1 69 46   .%8 ・'ﾇ<.ﾟF.HﾑiF
000000D0  FC 53 6C 38 21 B5 3F F8-0C 4D 5A 56 6F 39 98 ED   ..18!ｵ?..MZVo9 倆
000000E0  16 47 3F E8 0B 17 7C 3C-AA 37 E4 FD FF 5B 99 A7   .G?...|<ｪ7...[勢
000000F0  4E B6 93 1F 0F 03 BB E0-A6 73 80 3B E0 9B E3 95   Nﾊ....ｻ胞s.;燼縺
```

METHOD AND APPARATUS FOR ENCRYPTING AND DECRYPTING INFORMATION USING A DIGITAL CHAOS SIGNAL

BACKGROUND OF THE INVENTION

1. Field of the invention

The present invention relates to a method and apparatus for encrypting and decrypting information using a digital chaos signal such that a third person cannot understand the information.

2. Description of the related art

Encryption is employed for maintaining the secrecy of information and for preventing information from falsification and tampering during storage, transfer, and communication of the information. Cryptosystems (encryption/decryption systems) are used in various fields such as information networks (e.g. the INTERNET), communication, databases, electronic banking, EDI (electronic data interchange) systems and security systems for computers. They have become an important technology in the modern information society.

The first cryptosystem was the Caesar Cryptograph used in the Roman era. Since then, numerous higher level cryptosystems have been developed. In a modern cryptosystem computers are employed. Among modern cryptosystems, representative ones are DES (Data Encryption System) and RSA (named for its inventors Rivest, Shamir, and Adelman). DES is a popular encryption system which was adopted by the National Institute of Standards and Technology of the United States. RSA is also known as Public Key Cryptography. Various cryptanalysis methods have been developed. For example, the cryptosystem named FEAL-8 developed by NTT Corp. of Japan was cryptanalysed by A. Shamir in the United States. Thus, the security of cryptosystems is going down as time passes.

There are various problems in cryptosystems which were developed up to now.

a) Since DES was developed 15 years ago, it has become no longer safe. Some scholars predict that, with increases in the power of computers, a technology may be realized by the end of this century to decrypt information encrypted by the DES within a few days. Therefore, DES is not suitable for multimedia technology.

b) The algorithms of conventional cryptosystems are so complicated that the speed of processing becomes very slow. Therefore they are not adaptable to the demands of optical fiber transmission.

c) Since the lengths of the cryptographic keys are fixed, it is difficult for users to balance ease of use with the security of the cryptosystems.

d) Since cyclical processes such as DES are block cryptosystems, in some cases, such as graph data, they may be cryptanalyzed because of their periodicity.

e) The algorithms of conventional cryptosystems are not easy to update.

As one of the most advanced scientific theories for solving difficult scientific problems, chaos has attracted the interest of people in a variety of fields.

Chaos has large influences over the fields of science and technology. It is different from random appearance and is a complex appearance on a simple rule. Chaos' irregular change has no periodicity. For example, the appearance of a logistic chaos function is shown in FIG. 1.

SUMMARY OF THE INVENTION

An object of the present invention is to overcome the weak points of conventional encryption systems and to provide a new method and apparatus for encrypting and decrypting information using a digital chaos signal.

Another object of the present invention is to provide a method and apparatus for encrypting and decrypting information which can provide enhanced secrecy and which are applicable to high speed communication.

The present invention provides an improved method and apparatus for encrypting and decrypting plaintext. That is, plaintext is encrypted by adding to each group of signals in the plaintext a digital chaos signal in accordance with a chaos function, a delay, an initial value, and parameters of the chaos function determined using a cryptographic key which can be any length and any combination of letters, numerals, and words. The encrypted information is decrypted by decrypting each group of signals in the encrypted information using a digital chaos signal generated using the same key as that used in the encryption.

Preferably, the encryption of the information is repeated at least one more time while using at least a second key instead of the first key, and the decryption of the encrypted information is also repeated at least once while using at least the second key instead of the first key.

Compared with conventional encryption systems, the present invention has the following advantages.

1) The encryption and decryption according to the present invention can provide excellent secrecy, because of irregular changes in the chaos signal (non-predictability). In contrast to block ciphers (such as DES and FEAL-8), chaos signals have no periodicity. Thus, a text encrypted in accordance with the present invention cannot be decoded by a currently available decoding means without the knowledge of the encryption key. In addition, the length of the cryptographic key can be defined at will, and consequently the key is safer than the key of FEAL-8 or DES which has a constant length. When the length of the key is increased by 1 byte, the time required to analyze the code is multiplied by 256. In other words, a code according to the present invention is 256 times safer than DES.

2) In conventional block cryptosystems, signals of plaintext in a single block are encrypted by multiple recursions (16 times for DES, 8 times for FEAL-8). By contrast, the encryption and decryption according to the present invention can be carried out much faster, because chaotic signals are added to plaintext at one time. (The speed is not less than 4 times the speed of DES).

3) Usually, it is easy to remember a short key, but it is safer to use a longer key. Because of the free-length of the key, users can choose the length of the key as they like, maintaining a balance between easy of use and safety.

4) The present invention is adaptable to all kinds of information signals, from binary to complex sound-data, image-data, etc., thus meeting the demands of multimedia technology. In contrast, conventional block cryptosystems are not suitable for image-data. Being limited to 64 bit combination, images can be easily recovered by the use of their statistical properties.

5) By replacing one chaos function with another one to change the rule for generating chaotic signals, it is possible to completely prevent aging, a phenomenon in which safety decreases with time.

6) Since encryption and decryption according to the present invention permit a reduced memory size, a compact personal computer can be employed.

7) Encryption and decryption according to the present invention can be performed not only by computer software, but also by a logic circuit formed in an LSI.

8) Encryption and decryption according to the present invention are suitable for communication networks. This is the result of a stream cipher. For a circuit cipher device in a communication network, a stream cipher is generally used. Even in the international standard ISO-9160 (the standard for interoperation concerning a physical layer cipher device), there is a regulation that a cryptosystem with a circuit device must use a 1-bit or 8-bit stream cipher (one word).

9) Encryption and decryption according to the present invention are suitable for various fields such as satellite communication, communication networks, data bases, confidential documents, secret communication and a variety of security applications. Especially, they are suitable for computer systems because the encryption and decryption are performed digitally.

BRIEF DESCRIPTION OF THE DRAWINGS

FIG. 6 is a dump list showing plaintext;

FIG. 7 is a dump list showing ciphertext (encoded text);

FIG. 8 is a dump list showing a decrypted plaintext; and

FIG. 9 is a dump list showing a ciphertext which is generated by using a different key.

DETAILED DESCRIPTION OF THE INVENTION

Figure 1:
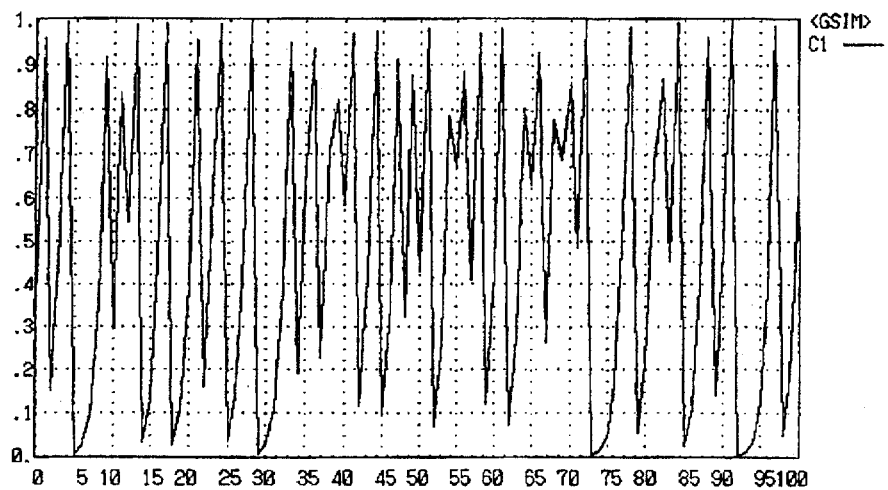
FIG. 1 is a graph showing a logistic chaos function.
Figure 2:
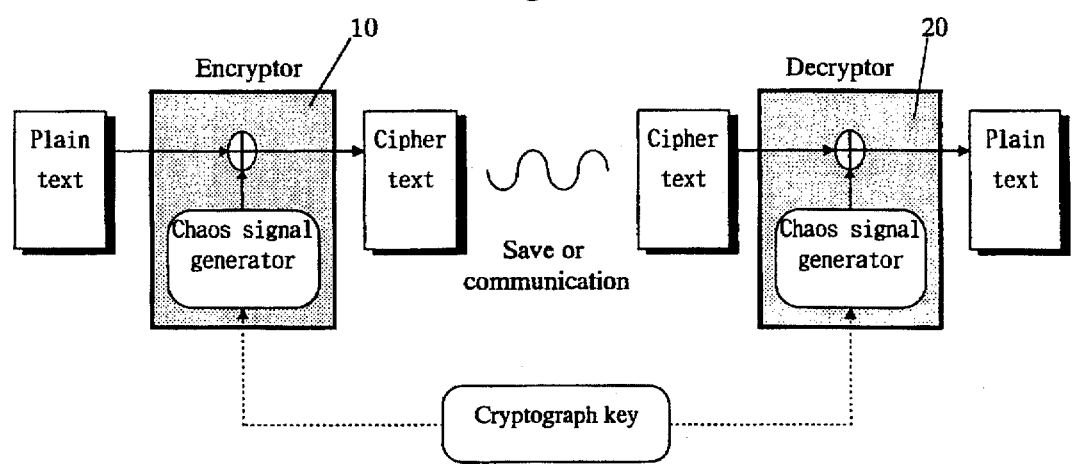
FIG. 2 is a block diagram of a digital chaos cryptosystem according to an embodiment of the present invention.

FIG. 2 shows a digital chaos cryptosystem according to an embodiment of the present invention.

When a plaintext and a cryptograph key are input to an encryptor 10, a ciphertext (encoded text) is output from the encryptor 10.

When the ciphertext and the same cryptograph key are input to a decryptor 20, a decrypted plaintext is output from the decryptor 20.

The plaintext input to the encryptor 10 is represented by $P(i)$, the ciphertext by $C(i)$, the cryptograph key by $K(j)$, and the chaos signal by $Ch(i)$. $P(i)$ and $C(i)$ are managed in a byte-by-byte fashion, and their lengths are both n bytes. $K(j)$ is a group of one or more alphabetic characters and/or numerals (e.g., a to z, 0 to 9) which are represented by ASCII codes, and the length is m bytes. Here, $0 < i \leq n$, $0 < j \leq m$.

Figure 3:
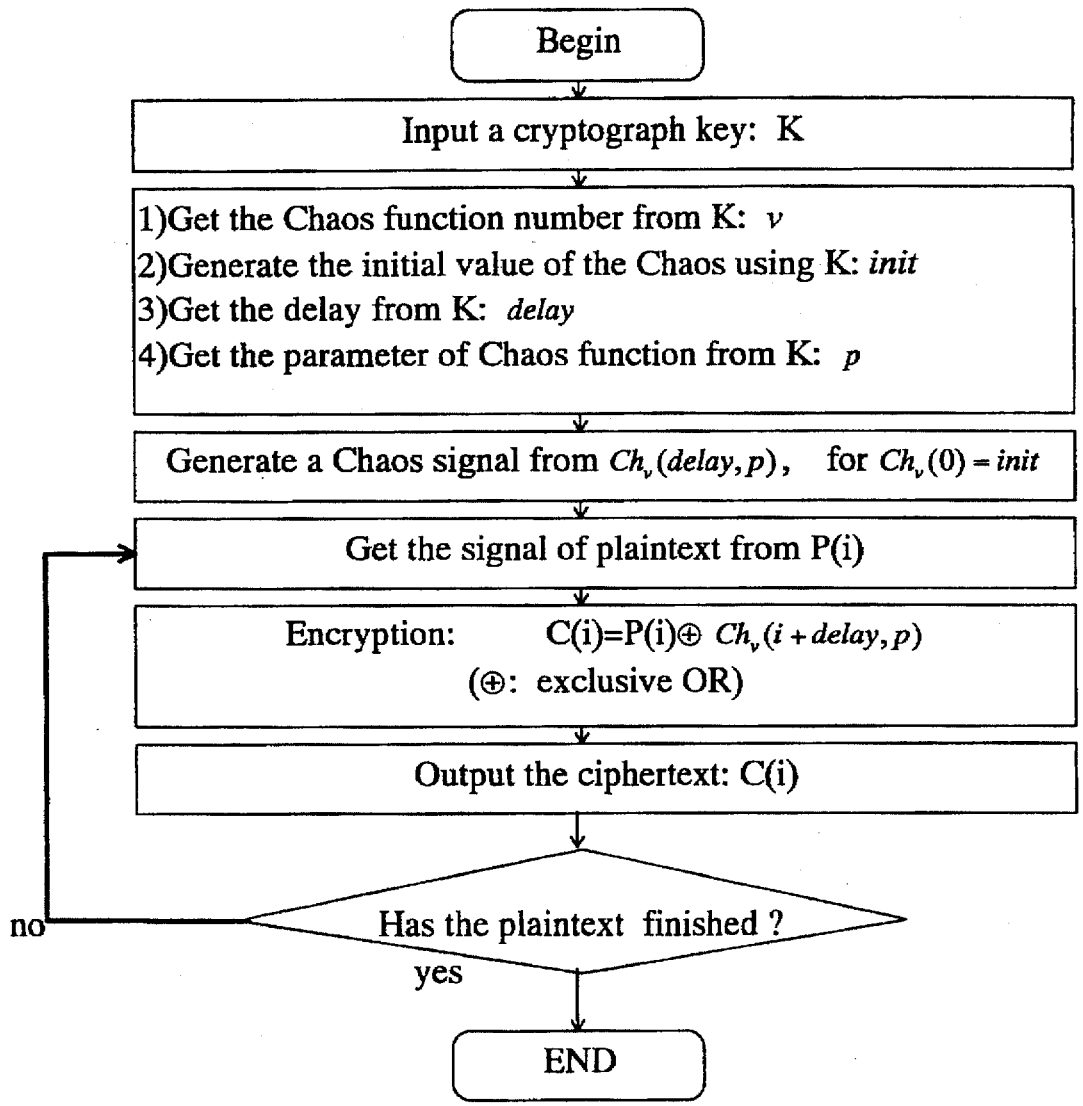
FIG. 3 is a flowchart showing the encryption procedure of the digital chaos cryptosystem shown in FIG. 2.
Figure 4:
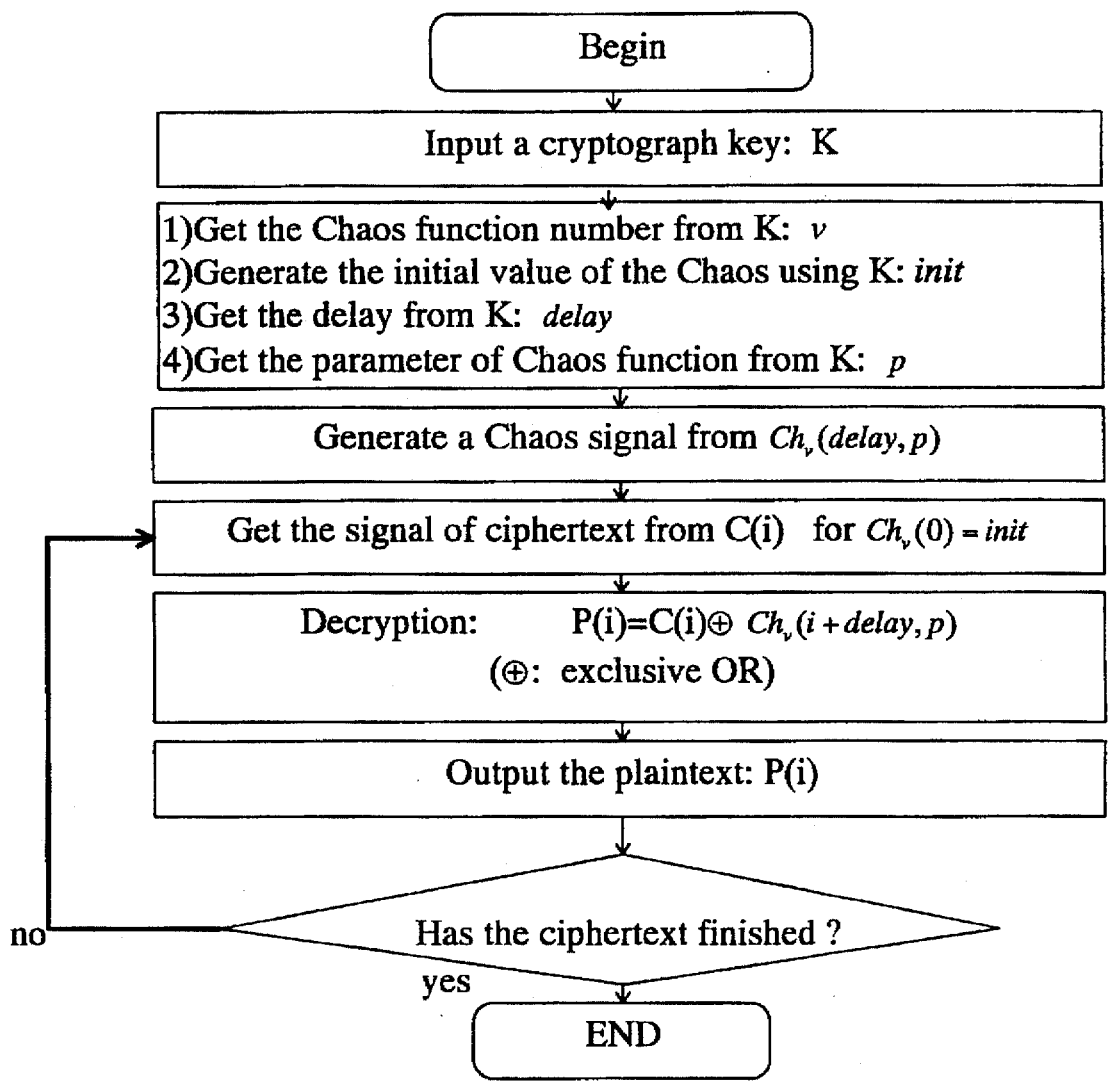
FIG. 4 is a flowchart showing the decryption procedure of the digital chaos cryptosystem shown in FIG. 2.

The flowchart of the encryption procedure of the present invention is shown in FIG. 3, and the decryption procedure is shown in FIG. 4.

Step 1:

The user inputs a series of characters with an arbitrary length as a cryptographic key K.

Step 2:

Using a key processing module, the chaos function number v to be used is selected from a plurality of chaos functions as shown in the below-described procedure regarding initial value function (). Also, the initial value init of the thus-selected chaos function, the delay of a chaos signal, and a parameter (or parameters) p of the chaos function are determined.

Initial value function f():

It uses a cryptograph key K in order to generate an initial value of the chaos function init, the chaos function number v, a delay of the chaos signal delay, and an attractor-control parameter which is used in the chaos function p.

```
begin
      job   = (double)(K)/L
      init  = job - (int)(job)
      delay = (int)(job) mod B
      p     = delay/L - (int)(delay/L )
      v     = (int)(delay/L) mod D
end
```

Here, L can be any irrational number, such as $L=\pi$;

B is an integral number; and

D is the total number of the chaos functions which are used in the chaos cryptosystem, wherein B>D.

Thus, the pattern of the chaos signal will be only defined by these four parameters.

Step 3:

Using a chaos signal generator, a digital chaos signal is generated as follows.

Chaos signal generator Ch(i,p):

It is possible to replace one kind of chaos function with another kind using the value v determined from the cryptographic key. For example, when v=1 then; the chaos function called used.

Logistic mapping is shown below:

```
Ch₁(i,p)
   begin
      x_{i+1} = p·x_i·(1.0-x_i)
      return (x_{i+1})
   end
```

When v=2, then another chaos function is used. An exemplary second chaos function is shown below:

```
Ch₂(i,p)
   begin
      x_{i+1} = x_i² - p
      return ((x_{i+1}+2)/4)
   end
   (Here, x_0 = init).
```

And when v=3, then the E. N. Lorenz chaos function can be used as follows:

```
Ch₃(i,p)
  begin
    x_i + 1 = (1.0 + ap) x_i - px_iy_i
    y_i + 1 = (1.0 - p) x_i - px_ix_i
  return (y_i + 1)
  end;
```

As shown above, in this invention, v (chaos function number) determines which chaos function will be used for the generation of chaos signals.

And in this one, the control technology of chaos' attractor can be used. Namely, we can change the attractor of a chaos function by using the attractor-control-parameter p to magnify the size of the keystream set.

Step 4:

A plaintext signal is input a register of the computer.

Step 5:

The plaintext signal is modified (encrypted) in the register of the computer by performing an exclusive OR operation between the plaintext and the digital chaos signal thus generated.

Step 6:

The plaintext signals thus modified are output as a ciphertext signal.

Step 7:

Steps 3 to 6 are repeated until the plaintext does not remain any more. When the plaintext comes to an end, the procedure proceeds to END.

The principle of a decrypting device is similar to that of an encrypting device. If a decryption key which has been input is identical to the cryptograph key used upon encryption, a similar digital chaos signal pattern is generated. Thus, exclusive OR operation can restore the ciphertext to its plain form as a matter of course. However, if a decryption key different from the cryptographic key is input, chaos function number v, initial value init, parameter(s) p of the chaos function vary so that a different chaos signal pattern is obtained. In this situation, the exclusive OR operation cannot restore the ciphertext to its plain form. In fact, small changes in v, init, delay, or p will result in a greatly different digital chaos signal pattern. In other words, chaos tends to be quite sensitively affected by its initial value. Therefore, the present invention assures extraordinarily strict secrecy.

Figure 5:
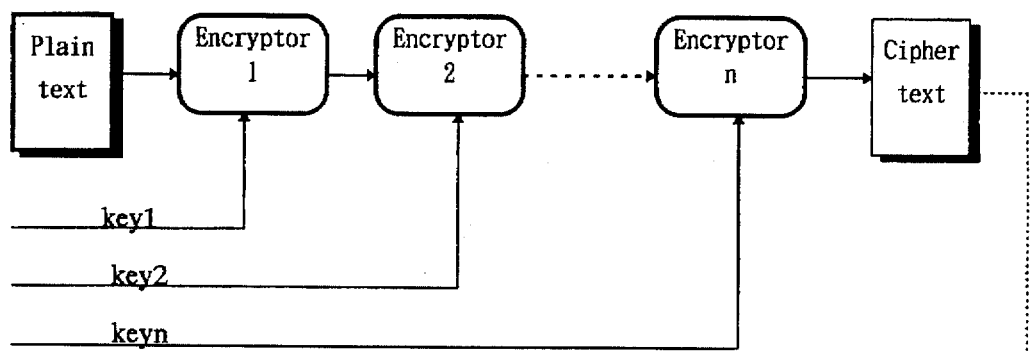
FIG. 5 is a block diagram of a multi-key and multi-layer chaos cryptosystem according to another embodiment of the present invention.
Figure 5:
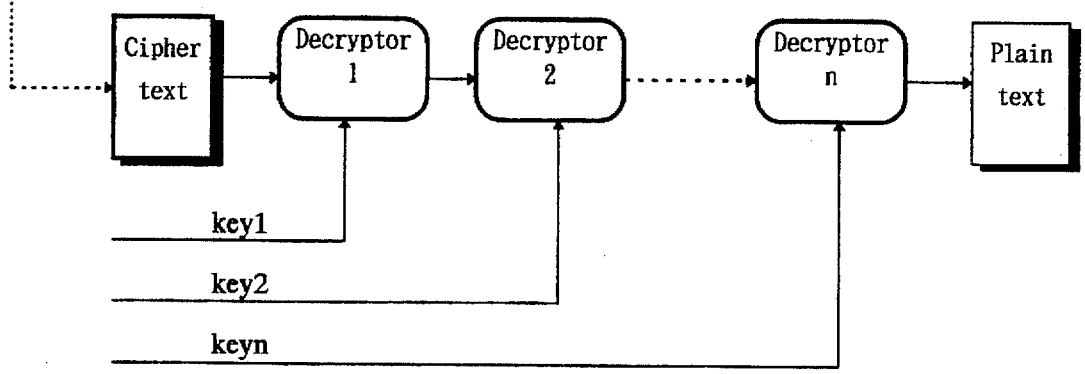

FIG. 5 shows a multi-key and multi-layer chaos cryptosystem according to another embodiment of the present invention.

By using the above-mentioned algorithm as a fundamental unit, the multi-key and multi-layer chaos cryptosystem shown in FIG. 5 can be formed.

The encryption/decryption system can be used for various purposes and provides enhanced secrecy.

Example:

An example of encryption and decryption in which the above-described chaos cryptosystem is used is shown as the dump lists (for MS-DOS) in FIG. 6 to FIG. 9. For the plaintext shown in FIG. 6, a group of alphabetic characters "gao" is input as a cryptograph key, then the plaintext becomes the ciphertext shown in FIG. 7. When the ciphertext is decrypted using the same cryptograph key "gao" and the same algorithm, the ciphertext is returned to plaintext, as shown in FIG. 8. When a group of alphabetic characters "gaol" is input as a different key, the plaintext becomes the ciphertext shown in FIG. 9.

It is to be understood that the invention is not limited to the precise embodiment described above and that minor modifications may be made within the scope of the invention.

What is claimed is:

1. A method of encrypting and decrypting information in plaintext, comprising the steps of:

encrypting information in plaintext by adding to each group of signals in the information a digital chaos signal based on a chaos function which is selected from plural chaos functions by a cryptographic key, a delay, an initial value, and a chaos-attractor-control parameter of the chaos function determined using the cryptographic key, wherein the cryptographic key can be any length and any combination of letters, numerals, and words; and decrypting the encrypted information by decrypting each group of signals in the encrypted information using a digital chaos signal generated using the cryptographic key used in the encryption.

2. A method of encrypting and decrypting information in plaintext, comprising the steps of:

encrypting information in plaintext by adding to each group of signals in the information a digital chaos signal based on a chaos function which is selected from plural chaos functions by a first cryptographic key, a delay, an initial value, and a chaos-attractor-control parameter of the chaos function determined using the first cryptographic key, wherein the first cryptographic key can be any length and any combination of letters, numerals, and words;

repeating at least one time the encrypting step while using at least a second cryptographic key instead of the first cryptographic key;

decrypting the encrypted information by decrypting each group of signals in the encrypted information using a digital chaos signal generated using the first cryptographic key; and repeating at least one time the decrypting step while using at least the second cryptographic key instead of the first cryptographic key.

3. An apparatus for encrypting and decrypting information in plaintext, comprising:

means for encrypting information in plaintext by adding to each group of signals in the information a digital chaos signal based on a chaos function which is selected from plural chaos functions by a cryptographic key, a delay, an initial value, and a chaos-attractor-control parameter of the chaos function determined using the cryptographic key, wherein the cryptographic key can be any length and any combination of letters, numerals, and words;

means for transmitting the encrypted information;

means for receiving the encrypted information; and means for decrypting the received information by decrypting each group of signals in the received information using a digital chaos signal generated using the cryptographic key used in the encryption means.

4. An apparatus for encrypting and decrypting information in plaintext, comprising:

means for encrypting information in plaintext by adding to each group of signals in the information a digital chaos signal based on a chaos function which is selected from plural chaos functions by a first cryptographic key, a delay, an initial value, and a chaos-attractor-control parameter of the chaos function determined using the first cryptographic key, wherein the cryptographic key can be any length and any combination of letters, numerals, and words;

means for repeating at least one time the encryption of the information while using at least a second cryptographic key instead of the first cryptographic key;

means for transmitting the encrypted information;

means for receiving the encrypted information;

means for decrypting the received information by decrypting each group of signals in the received information using a digital chaos signal generated using the first cryptographic key; and means for repeating at least one time the decryption of the information while using at least the second cryptographic key instead of the first cryptographic key.

5. The method as claimed in claim 1, wherein the step of encrypting comprises the step of combining the plaintext and the digital chaos signal using an exclusive OR function to produce the encrypted information; and wherein the step of decrypting comprises the step of combining the encrypted information and the digital chaos signal using an exclusive OR function to recover the plaintext.

6. The method as claimed in claim 2, wherein the step of encrypting comprises the step of combining the plaintext and the digital chaos signal using an exclusive OR function to produce the encrypted information; and wherein the step of decrypting comprises the step of combining the encrypted information and the digital chaos signal using an exclusive OR function to recover the plaintext.

7. The method as claimed in claim 3, wherein the means for encrypting comprises means for combining the plaintext and the digital chaos signal using an exclusive OR function to produce the encrypted information; and wherein the step of decrypting comprises means for combining the encrypted information and the digital chaos signal using an exclusive OR function to recover the plaintext.

8. The method as claimed in claim 4, wherein the means for encrypting comprises means for combining the plaintext and the digital chaos signal using an exclusive OR function to produce the encrypted information; and wherein the step of decrypting comprises means for combining the encrypted information and the digital chaos signal using an exclusive OR function to recover the plaintext.

\* \* \* \* \*